May 15, 1923.　　　　　　E. L. ZIOLA　　　　　　1,455,131
ANIMAL TRAP
Filed April 6, 1922
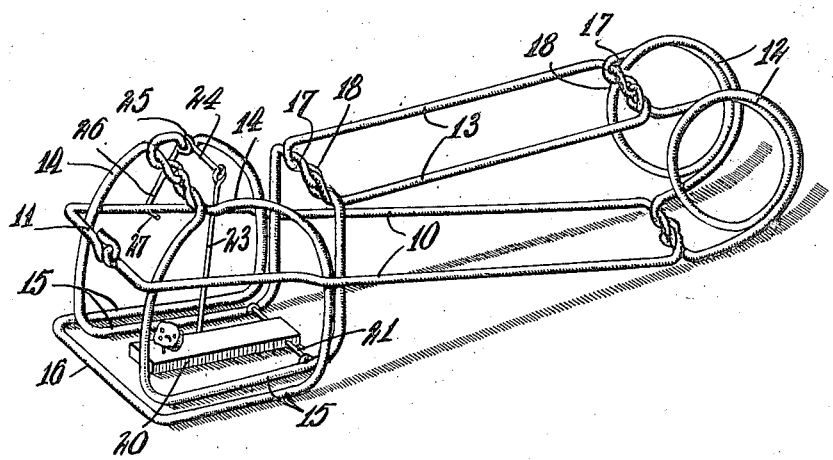
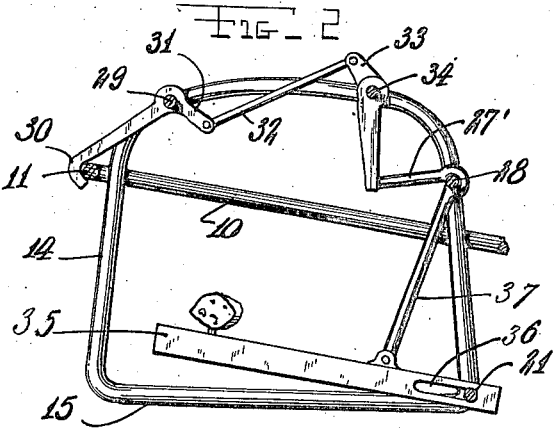
Inventor
Edward L. Ziola
By Joltan P. Polachek
Attorney Patented May 15, 1923.

1,455,131

UNITED STATES PATENT OFFICE.

EDWARD L. ZIOLA, OF ASHTON, NEBRASKA.

ANIMAL TRAP.

Application filed April 6, 1922. Serial No. 550,133.

*To all whom it may concern:*

Be it known that I, EDWARD L. ZIOLA, a citizen of the United States, residing at Ashton, in the county of Sherman and State of Nebraska, have invented certain new and useful Improvements in Animal Traps, of which the following is a specification.

This invention relates to animal traps such as are used for catching rats, mice, or other animals, and it has for an object to provide an animal trap of efficient operation and characterized by extreme simplicity and cheapness of construction.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of my improved trap.

Fig. 2 is a fragmentary longitudinal section showing a modification.

In constructing my improved trap I employ a single length of wire which forms a pair of substantially parallel reaches 10 united together in a transverse element 11 at the front end of the trap by joining the ends of the wire, these elements 10, 11 providing the spring jaw of the trap. At the rear end of the members 10 the wire is formed into vertical loops 12 from the lower sides of which the members 11 project. From the upper sides of these loops 12 the wire is extended forwardly in two reaches 13 which at their forward ends form large downwardly projected loops 14 having doubled flat bottom members 15, the wire being carried, at the point midway between its ends, across from the lower forward portion of one loop 15 to the other as at 16. This transverse portion 16 is in substantial vertical registry with the end jaw member 11 and forms a fixed jaw co-operating therewith.

The trap rests on the bottoms of the loops 12 and 15 which lie in a common plane. The top reaches 13 and loops 12 and 14 form in effect a pair of side frames for the trap, and to keep the same properly spaced the two reaches of the wire may be bent at suitable points to form transverse bracing members 17 each formed of twisted parts projected inward from the respective sides and looped together as at 18.

As here shown the trap is designed to be sprung by the animal stepping on a footboard 20 located between the loop elements 14 and hinged at its rear end to a crosspiece 21 extending between the latter. This footboard has connected thereto the lower end of a link 23 whose upper end connects to an inwardly extending arm on a bell crank lever 24 fulcrumed as at 25 on the top portion of one of the loops 14 and having its other arm 26 extending downwardly and provided with a hook 27 engaging under one of the spring jaw members 10.

As will be apparent, when the animal steps on the foot-piece 20, the arm 26 of the bell crank lever will be swung out, freeing the spring jaw 11 which falls and pins the animal between itself and the fixed jaw 16.

In the modification shown in Fig. 2 the foot-board 35 is provided with a longitudinal slot 36 in its rear end through which the supporting cross-piece 21 passes freely. To the foot-board 35 is connected one arm 37 of a bell crank fulcrumed on a crosspiece 28 extending between the two loops 14. Fulcrumed on another crosspiece 29 extending between the two loops 14 is a second bell crank having a hooked arm 30 engaging under the jaw 11. The other arm 31 of this bell crank is connected by a link 32 with one end of a lever 33 fulcrumed between its ends as at 34 and bearing against the end of the other arm 27' of the first bell crank. As will be understood the parts will be so arranged that the spring jaw 11 will free itself from the hooked arm 30 once the abutment provided by the end of bell crank arm 27' is removed by stepping on the foot-board or pushing on the same.

Having thus described my invention what I claim as new and desire to protect by Letters Patent of the United States is as follows:

1. An animal trap comprising a single length of wire arranged in the form of a pair of vertical loops at its rear end, and having a pair of reaches extending forwardly from the lower sides of said loops and united at their forward ends in a movable jaw element, said wire having a pair of reaches extending forwardly from the upper sides of said loops and arranged at their forward ends in the form of vertical loops having flat bottom portions, said last loops being substantially parallel to said reaches and united at their lower forward ends by the intermediate portion of the wire which constitutes a fixed jaw, and a trigger device holding said movable jaw element raised.

2. An animal trap comprising a single length of wire arranged in the form of a pair of vertical loops at its rear end, and having a pair of reaches extending forwardly from the lower sides of said loops and united at their forward ends in a movable jaw element, said wire having a pair of reaches extending forwardly from the upper sides of said loops and arranged at their forward ends in the form of vertical loops having flat bottom portions, said last loops being united at their lower forward ends by the intermediate portion of the wire which constitutes a fixed jaw, and a trigger device holding said movable jaw element raised, said trigger device comprising a hinged foot-board, a link connected thereto, and a bell crank lever having a hooked arm engaging under one of the reaches extending forwardly from the said rear loops and a second arm to which said link is connected.

3. An animal trap comprising a single length of wire arranged to form a pair of side frames, a fixed jaw, and a spring jaw, and a trigger device holding said spring jaw open, said trigger device comprising a foot-board adapted for swinging and sliding movement, a lever engaging the spring jaw, and a member connected to the foot-board and retaining said lever in operative engagement with said spring jaw.

In testimony whereof I have affixed my signature.

EDWARD L. ZIOLA.